United States Patent [19]

Suzuki et al.

[11] Patent Number: 4,571,046

[45] Date of Patent: Feb. 18, 1986

[54] AUTOMATIC FOCUS DETECTING CAMERA

[75] Inventors: Koji Suzuki; Eiichi Tano, both of Tokyo, Japan

[73] Assignee: Asahi Kogaku Kogyo Kabushiki Kaisha, Tokyo, Japan

[21] Appl. No.: 596,172

[22] Filed: Apr. 2, 1984

[30] Foreign Application Priority Data

Mar. 31, 1983 [JP] Japan .................................. 58-56481

[51] Int. Cl.⁴ .......................................... G03B 17/00
[52] U.S. Cl. ...................................... 354/400; 354/286
[58] Field of Search ................................ 354/400, 286

[56] References Cited

U.S. PATENT DOCUMENTS 4,118,713 10/1978 Murakami et al. .................. 354/286
4,364,652 12/1982 Iwata et al. ........................ 354/286
4,475,800 10/1984 Kinoshita et al. .................. 354/286

*Primary Examiner*—Russell E. Adams

*Attorney, Agent, or Firm*—Sughrue, Mion, Zinn, Macpeak & Seas

[57] ABSTRACT

An automatic focus detecting camera in which the full-aperture f-number of a lens mounted on the camera is automatically detected and applied to a focus detecting circuit. The lens is provided with indicating pins in a pattern indicative of a full-aperture f-number of the lens. Switch contact pins are provided on the lens mount of the camera positioned corresponding to the positions of the indicating pins, with the switch contact pins being operated in accordance with the presence or absence of the corresponding indicating pins. The states of the switch contact pins are decoded to provide data indicative of the full-aperture f-number of the lens. If the lens does not have any indicating pins, the decoding circuitry outputs a fixe value, which can be shifted by a manual switch on the body of the camera. Also, a manual switch may be provided on the body of the camera for instructing the full-aperture f-number in the case that the lens does not have any indicating pins.

3 Claims, 23 Drawing Figures

FIG. 2A  SMALL F-NO.

FIG. 2D  LARGE F-NO.

AUTOMATIC FOCUS DETECTING CAMERA

BACKGROUND OF THE INVENTION

The present invention relates to a camera which utilizes the variation of contrast of an object as the focus position of the photographing lens of the camera is changed to automatically detect the position of correct focus.

An example of a focus detecting system is disclosed by Japanese Laid-Open Patent Application No. 64711/1982, filed by the same applicant. In this system, two contrast detecting elements are provided, disposed on opposite sides of a position equivalent to the position of the focal plane with respect to the lens system equidistantly spaced from that position. Contrast signals outputted by the contrast detecting elements are used to detect the position of correct focus. However, that system is rather troublesome because, whenever the lens is changed to one having a different maximum (full-aperture) f-number, it is necessary to change the focus detecting algorithm employed by operating a mechanical switch. This problem may be solved by employing some device for automatically changing the algorithm of the focusing detecting circuit when the lens is changed. However, such a device is complex and not practical.

Figure 1A:
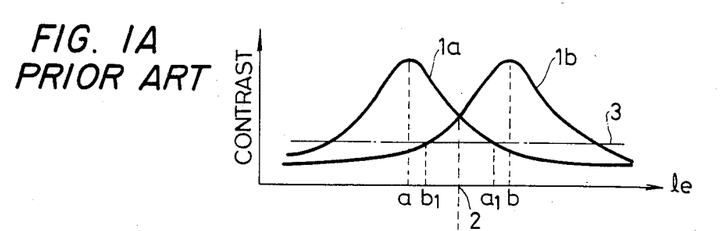

This situation will be described in more detail with reference to FIGS. 1A through 1C. In FIG. 1A, the horizontal axis indicates an amount of extension (le) of a lens (related to the position of the focusing ring), while the vertical axis indicates the magnitude of a contrast signal produced as the amount of extension is varied. More specifically, contrast detecting elements SA and SB (not shown) are arranged at respective positions a and b corresponding to two different amounts of lens extension, one on either side of the plane of the film surface. The amounts of light received by the two detecting elements SA and SB are equal. Therefore, when the focused position coincides with either of the detecting elements' position, the respective contrast signal is a maximum. Each of the contrast signals falls off symmetrically on both sides of this position. The contrast signals $1a$ and $1b$ have similar distributions. Accordingly, the position 2 of the intersection of the distribution curves of the contrast signals $1a$ and $1b$ is equidistant from the two positions a and b and represents the correctly focused position, that is, when the difference between the contrast signals $1a$ and $1b$ becomes zero, a correctly focused position is obtained.

Figure 1B:
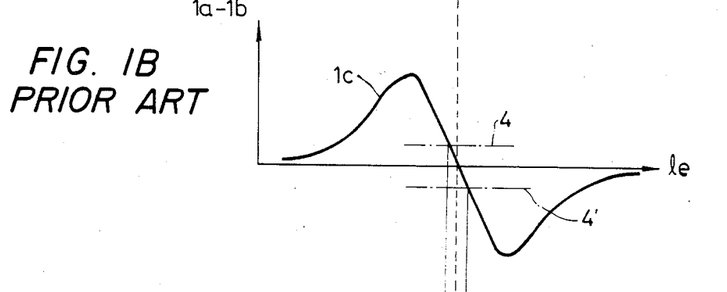
Figure 1C:
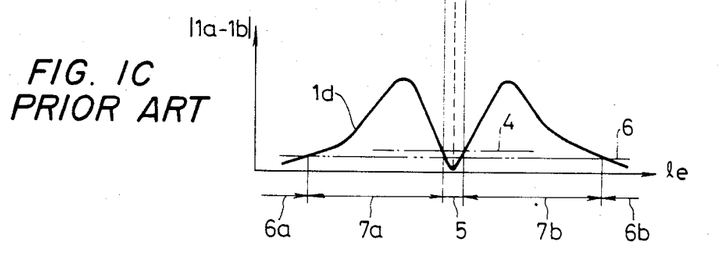

To implement this focus detecting scheme, a difference signal $1c$ between the contrast signals $1a$ and $1b$ is produced as shown in FIG. 1B. As indicated in FIG. 1A, an effective focus range limit level 3 is set for the contrast signals $1a$ and $1b$, and a focus indicating signal is outputted when the amount of lens extension le is in a range of $b_1$ to $a_1$ in which the values of the contrast signals $1a$ and $1b$ are both higher than the limit level 3. In addition, the absolute value $1d$ of the difference signal $1c$ is obtained as shown in FIG. 1C. When the signal $1d$ is smaller than a focus detecting threshold level 4 and is in the range $b_1$ to $a_1$, that is, when the amount of lens extension is in a range 5, a focus indicating signal is outputted indicating that the present lens position is acceptable. In the case where the signal $1d$ is larger than the threshold level 4, when the signal $1c$ (FIG. 1B) is positive and larger than the threshold level 4, a signal representing a front focused state is outputted, and when the signal $1c$ is negative and smaller than a level $4'$ (which is symmetric about the X axis with respect to the threshold level 4), a signal indicating a rear focused state is outputted. Furthermore, when the signal is out of the range 5 and smaller than a level 6, that is, when the amount of lens extension is in a range $6a$ or $6b$, a signal indicating the fact that a focused position cannot be detected is outputted. Accordingly, the signal indicating the front focused state is outputted when the amount of lens extension is in a range $7a$, and the signal indicating the rear focused state is outputted when the amount of lens extension is in a range $7b$. In order for the focus indicating range 5 to be independent of the contrast of the object, the threshold level 4 is made proportional to the sum of the contrast signals $1a$ and $1b$.

In general, as the full-aperture f-number of a photographing lens increases, the depth of field increases. Therefore, as shown in FIG. 2D, contrast signals $1a''$ and $1b''$ produced in the case where the full-aperture f-number is large, have wider distributions than contrast signals $1a'$ and $1b'$ (FIG. 2A) produced when the f-number is small. The peak values of the contrast signals do not change when the full-aperture f-number is changed. Therefore, the focus detecting threshold level $4b$ for the case of a large full-aperture f-number indicated in FIG. 2E is substantially equal to that $4a$ of FIG. 2B for which the full-aperture f-number is small. Accordingly, a focus indicating range $5b$ defined by the intersections of the threshold level $4b$ and an absolute value signal $1d'''$, similar to that of FIG. 1C, is much wider than a focus indicating range $5a$ for an absolute value signal $1d'$ in the case where the full-aperture f-number is small. As a result, the depth of field of the photographing lens may be exceeded in the former case. In order to overcome this difficulty, it is necessary to set the focus detecting threshold levels $4a$ and $4b$ in accordance with the full-aperture f-number so that the widths of the focus indicating ranges $5a$ and $5b$ correspond with the depth of field of the photographing lens. In order to meet this requirement, it is necessary to provide a switching mechanism on the camera which is set in accordance with the full-aperture f-number of the photographing lens whenever the photographing lens is changed.

Figure 2A:
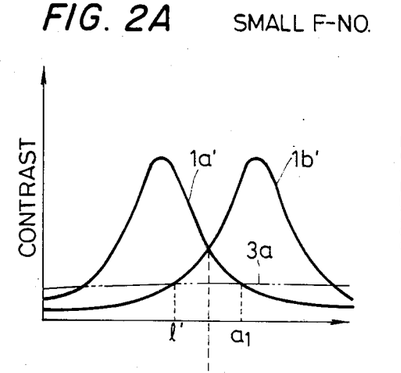
Figure 2B:
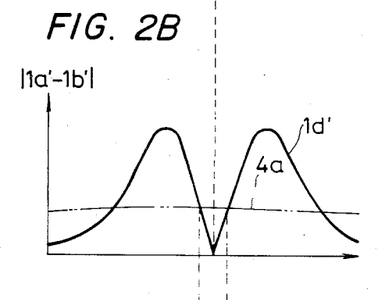
Figure 2C:
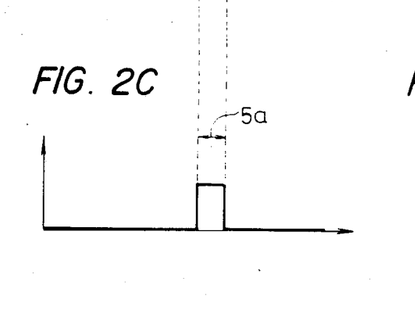
Figure 2D:
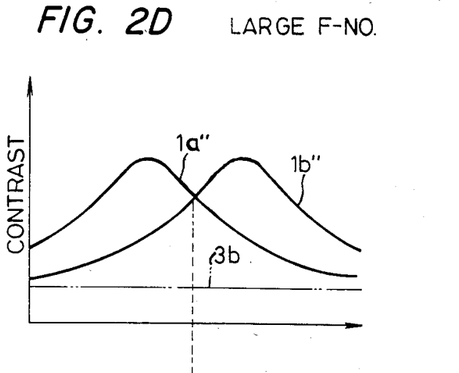
Figure 2E:
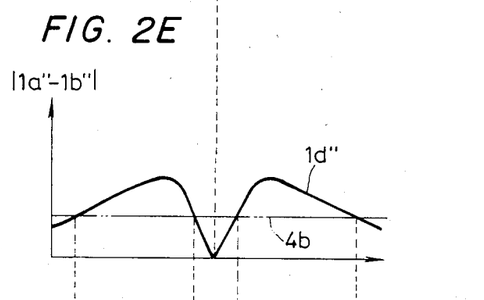
Figure 2F:
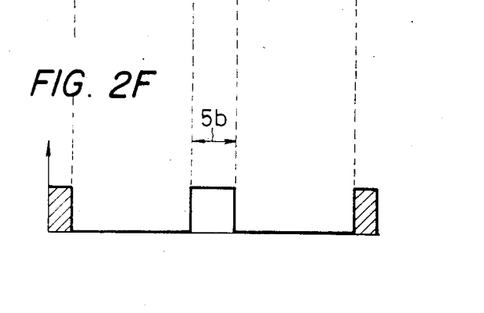

In more detail, if the effective focus range limit levels provided for the cases of small and large full-aperture f-numbers are fixed such that the levels $3a$ and $3b$ are equal to each other, a focus indicating range $b_1'$ to $a_1'$ can be defined for the contrast signals $1a'$ and $1b'$ produced in the case of a small full-aperture f-number as shown in FIG. 2A, while for the contrast signals $1a''$ and $1b''$ produced in the case of a large full-aperture f-number, the focus indicating range is substantially unlimited, and accordingly a false focus indicating signal may be produced in the ranges indicated by shading in FIG. 2F. In the case illustrated in FIG. 2C where the full-aperture f-number is small, focusing is indicated only in the range $b_1'$ to $a_1'$, and therefore no false focus indicating signal is produced.

Figure 3A:
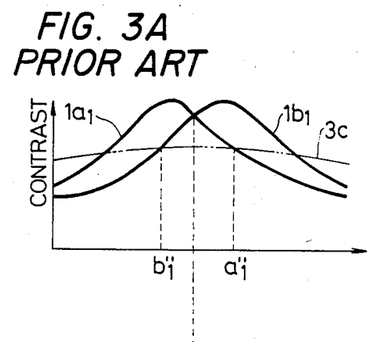
Figure 3B:
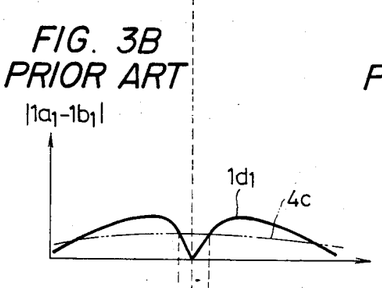
Figure 3C:
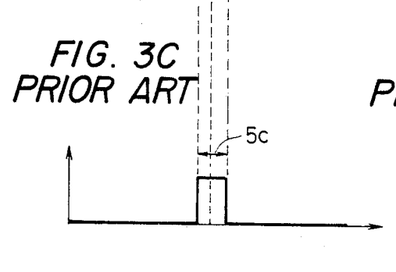
Figure 3D:
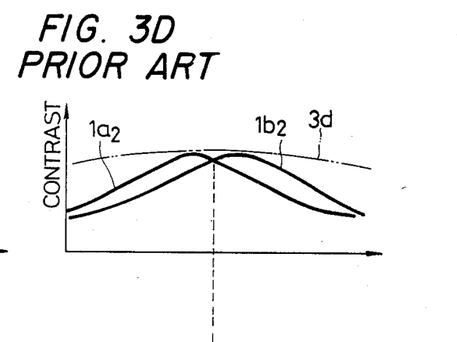
Figure 3E:
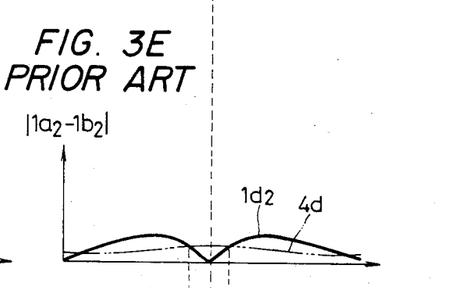
Figure 3F:
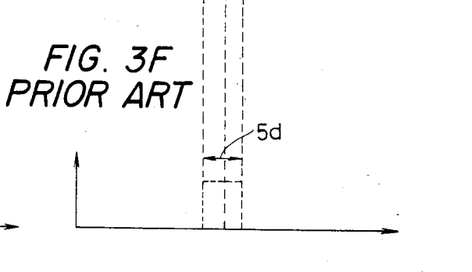

The case will now be considered where, in order to make the effective focus range limit level suitable for the situation in which the full-aperture f-number is large, the effective focus range limit level $3c$ is made relatively large for contrast signals $1a_1$ and $1b_1$ to thus obtain a range $b_1''$ to $a_1''$ as indicated in FIG. 3A. In this case, contrast signals $1a_2$ and $1b_2$ for an object of relatively low contrast are smaller than an effective focus range limit level $3d$ equivalent to the above-described effective focus range limit level as shown in FIG. 3D. Accordingly, as shown in FIG. 3E, the focus indicating signal is inhibited in a focus indicating range $5d$ defined by the intersections of a focus threshold level $4d$ and an absolute value signal $1d_2$ similar to that of FIG. 1C. The inhibited output is indicated by a dashed line in FIG. 3F. In the case where the contrast is high, as shown in FIGS. 3B and 3C, a focus indicating range $5c$ defined by an absolute value signal $1d_1$ and a focus threshold level $4c$ indicates the fact that the focus indicating signal in the range $b_1''$ to $a_1''$ is outputted in the range indicated by the solid line.

As is apparent from the description of FIGS. 2A to 3F, if the effective focus range limit level is fixed, then a false focusing signal may be produced in some instances. In order to eliminate this difficulty, it is necessary to determine the threshold levels $4a$ and $4b$ in accordance with the full-aperture f-number of the lens. Also, it is also necessary to set the effective focus range limit level to a value suitable for each full-aperture f-number. If the conventional approach as discussed above is employed to meet these requirements, the resulting system is accompanied by a troublesome switching operation.

SUMMARY OF THE INVENTION

The invention has been developed to overcome the above-described difficulties.

According to the invention, when a photographing lens is mounted on the camera, indicator pins on the photographing lens, the pattern of which (as determined by the presence or absence of various ones of the pins) is indicative of the full-aperture f-number of the lens, cause corresponding switch contact pins on the surface of the camera's lens mount to be connected, for instance, to a ground terminal, to provide data indicative of the full-aperture f-number of the lens. This data is decoded to produce a signal representing the full-aperture f-number, which is applied to a focus detecting circuit. Accordingly, the range of the focus detecting circuit is automatically made to conform with the depth of focus of the photographing lens.

BRIEF DESCRIPTION OF THE DRAWINGS

FIGS. 1A to 3F are explanatory diagrams for a description of a focus detecting principle using contrast data in a focus detecting circuit concerning the invention;

DESCRIPTION OF THE PREFERRED EMBODIMENTS

Preferred embodiments of the invention will now be described with reference to the accompanying drawings.

Figure 4:
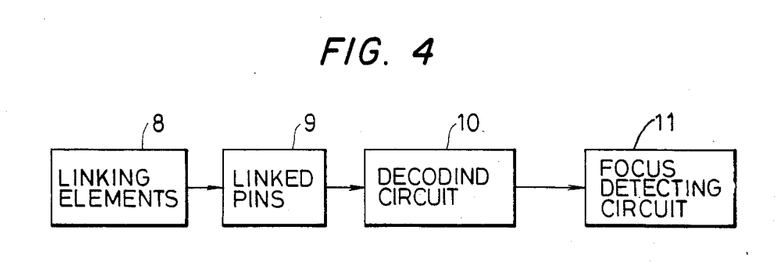
FIG. 4 is a block diagram of a control circuit for an automatic focus detecting camera of the invention.

FIG. 4 is a block diagram showing an automatic focus detecting camera constructed according to the invention. Indicator pins 8 are provided in a predetermined pattern on the surface of a lens mount. Switch contact pins 9 are provided on the surface of a camera mount, with one of the switch contact pins 9 being provided for each possible location of an indicator pin 8. The indicator pins 8 cause the respective switch contact pins 9 to be set to positions corresponding to the full-aperture f-number of the lens employed. A decoding circuit 10 decodes the operating state of the pins 9 and applies accordingly a signal to a focus detecting circuit 11 indicative of the full-aperture f-number of the lens. The focus detecting circuit 11 compares the contrast signals $1a$ and $1b$ with the effective focus range limit level 3, as shown in FIG. 1A, for instance, to obtain the range $b_1$ to $a_1$ in which outputting of the focus indicating signal is permitted, or to compare the absolute value signal $1d$ with the focus detecting threshold level 4 as shown in FIG. 1C to obtain the range 5 and to thereby produce the focus indicating signal in the range thus obtained.

Figure 5:
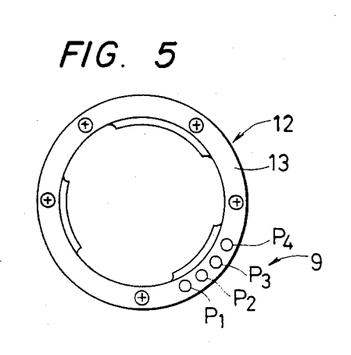
FIG. 5 is a front view of the mount of a camera constructed according to the invention.
Figure 6:
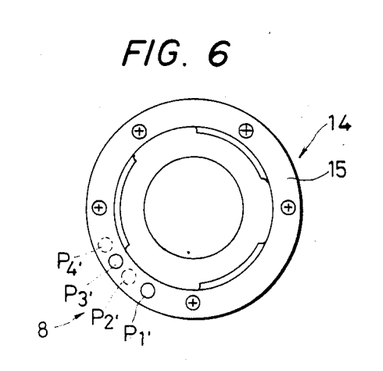
FIG. 6 is a front view of the mount of a lens for a camera of FIG. 5.

FIG. 5 shows the mount 12 of the camera body. Four switch contact pins $P_1$ through $P_4$ protrude from the mount surface 13 of the camera body. These switch contact pins correspond to the pins 9 indicated schematically in FIG. 4. The switch contact pins are electrically insulated from the mount 12 of the camera body and are connected to the decoding circuit 10. FIG. 6 shows the mount 14 of the photographing lens. Positions for four indicator members $P_1'$ through $P_4'$ are provided on the mount surface 15 of the lens in correspondence with the positions of the switch contact pins $P_1$ through $P_4$. These indicator pins correspond to the pins 8 indicated schematically in FIG. 4. The indicator members $P_1'$ through $P_4'$, only certain ones of which are actually present for any given photographing lens, are electrically insulated from the lens mount 14. If the indicator members $P_1'$ and $P_3'$, for instance, are present and engaged with the corresponding switch contact pins, $P_1$ and $P_3$, the switch contact pins $P_1$ and $P_3$ are then pushed inwardly but are biased toward the indicator members $P_1'$ and $P_3'$ which are electrically insulated from the lens mount 14. Therefore, the switch contact pins $P_1$ and $P_3$ remain electrically insulated from the camera body. On the other hand, the other switch contact pins $P_2$ and $P_4$ in the example, are pushed inwardly but are biased toward the lens to make electrical contact with the lens mount surface 15. The lens mount surface 15 is in electrical contact with the mount surface 13 of the camera body connected to ground. Consequently, the switch contact pins $P_2$ and $P_4$ are grounded. In FIG. 6, the dashed lines indicate the positions of indicator members $P_2'$ and $P_4'$, which are not actually present in this examples but may be present for other lenses.

The various combinations of the presence and absence of the various ones of the indicator members $P_1'$ through $P_4'$ indicate the full-aperture f-numbers of lenses as indicated in Table 1.

In Table 1, the data for a full-aperture f-number (FNC) $f_0$ is for the case a lens having no indicator members ($P_1'$ through $P_4'$), and the data for a full-aperture f-number $f_1$ is for the case where no lens is mounted. Further in Table 1, a logic level "1" indicates an operating state in which a corresponding switch contact pin is in electrical contact with the camera body, and a logic level "0" indicates an operating state in which the pin is not in electrical contact with the camera body.

Figure 7:
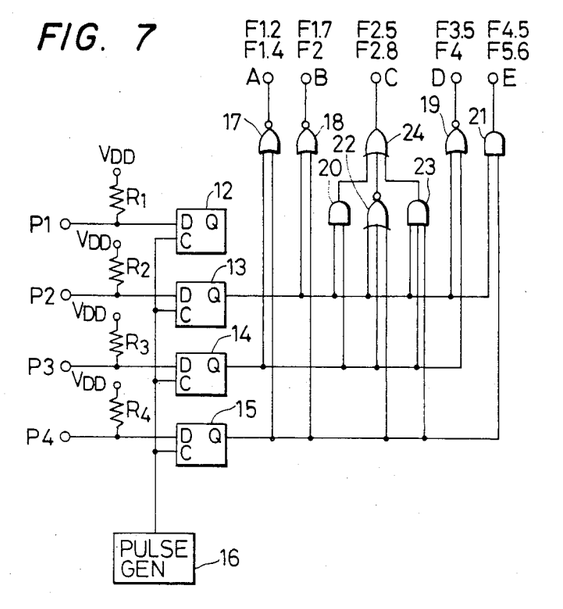
FIGS. 7, 9 and 11 are circuit diagrams showing examples of a decoding circuit indicated in FIG. 4.

FIG. 7 shows an example of the decoding circuit 10 of FIG. 4. The logic of the decoding circuit 10 is arranged such that when logic signals according to the f-number of the lens being used as indicated at columns $P_1$ through $P_4$ in Table 1 are applied to the corresponding input terminals (switch contact pins) $P_1$ through $P_4$, among the output terminals A through E, the output terminal corresponding to the f-number has a logic level "1" and the remaining output terminals have a logic level "0". The output terminals A through E are provided for the respective f-numbers in Table 1 which are grouped according to Ev (exposure) values. In this embodiment, the full-aperture f-numbers having common values with respect to columns $P_2$, $P_3$ and $P_4$ in Table 1 are grouped. This is due to the fact that since the distributions of the contrast signals do not vary significantly within about $\frac{1}{2}$ Ev, the full-aperture f-numbers should be grouped with differences of 1 Ev, that is, by factors of $\sqrt{2}$. In this case, the data of the input terminal $P_1$ is not used.

As shown in FIG. 7, a positive $V_{DD}$ is applied through pull-up resistors $R_1$ through $R_4$ to the pins $P_1$ through $P_4$, respectively, which are connected to inputs of respective D-type flip-flops 12 through 15. The clock terminals C of the flip-flops 12 through 15 receive a pulse of a signal having a frequency of 100 Hz, for instance, from a pulse generator circuit 16 to latch the data at the pins $P_1$ through $P_4$. A decoder is provided by NOR gates 17, 18, 19 and 22, AND gates 20, 21 and 23, and OR gate 24, which produces output signals A through E in accordance with the f-number groups specified by the data on pins $P_1$ through $P_4$ as indicated in Table 2. The NOR gate 22 produces a logic level "1" for the full-aperture f-number $f_0$ in Table 2, and the AND gate 23 produces a logic level "1" for the full-aperture f-number $f_1$. Thus, the gates 22 and 23 operate in combination with the AND gate 20 and the OR gate 24 to cause the terminal C to be at the logic level "1", and hence to indicate an intermediate f-number, in the case where no indicator pins are provided or no lens is mounted. This prevents an erroneous operation which would otherwise occur if no f-number were specified. The above-described effective range limit level and focus detecting threshold level are selectively determined according to the decoded data at the terminals A through E.

Figure 8:
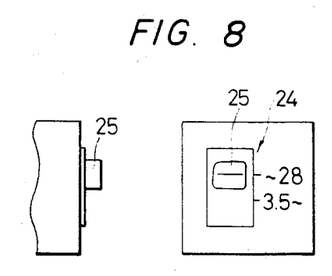
FIG. 8 is a diagram including a front view and a side view of an operating switch in the circuit of FIG. 9.

A second embodiment of the invention will now be described in which a manual switch for external instruction is provided on the camera body so that, in the case also when the full-aperture f-number is $f_0$ or $f_1$, the decoding operation is performed. FIG. 8 is a diagram including a front view and a side view showing the external appearance of the operating switch 24. When the operating button 25 is positioned as shown in FIG. 8, the switch is turned off. This position is used when a lens having no indicator pins ($P_1'$ through $P_4'$) has a full-aperture f-number of 2.8 or smaller. When the operating button 25 is moved downwardly in FIG. 8, the switch is turned on. This position is used when the lens has a full-aperture f-number of 3.5 or larger.

Figure 9:
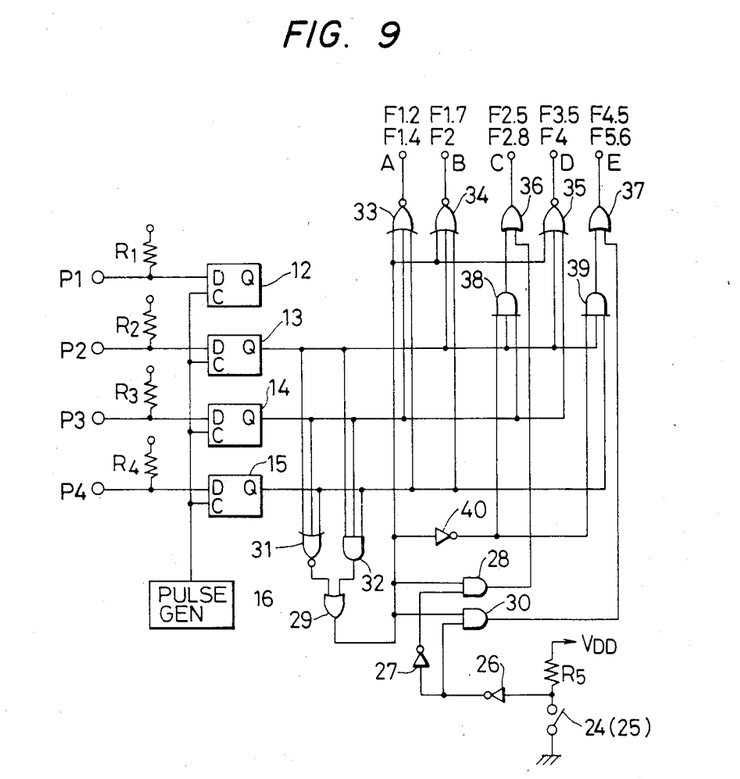

FIG. 9 shows a decoding circuit used in the second embodiment, which operates according to the truth table of Table 3. The switch 24 receives a positive voltage $V_{DD}$ through a resistor $R_5$ connected to one terminal of the switch, the other terminal of which is electrically coupled to the camera body. When the switch is turned off, the output of an OR gate 29 is passed through an AND gate 28 because the output of the inverter 27 is a logic "1"; and when the switch is turned on, the output data of the OR gate 29 is passed through an AND gate 30 because the output of the inverter 26 is a logic "1". When a NOR gate 31 or an AND gate 32 receives inputs "0 0 0" or "1 1 1", corresponding to the full-aperture f-number $f_0$ or $f_1$ in Table 3, a logic "1" is provided at the output terminal C or E through the AND gate 28 or 30 according to the setting of the switch 24. The output of the NOR gate 29 is applied to inputs of each of NOR gates 33, 34 and 35, OR gates 36 and 37, AND gates 38 and 39 and an inverter 40 so that the output values indicated in Table 3 are obtained.

A third embodiment of the invention will now be described in which a manual change-over switch used for external instruction is provided on the camera body, and the indicator pins $P_1'$ through $P_4'$ are also used to indicate a decoding signal for a full-aperture f-number different therefrom.

Figure 10:
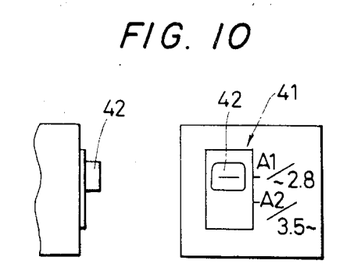
FIG. 10 is a diagram including a front view and a side view of a change-over switch in the circuit of FIG. 11.

FIG. 10 is a diagram including a front view and a side view illustrating the external appearance of the change-over switch 41 of the third embodiment. When the switch 41 is positioned as shown in FIG. 10, the switch is turned off. This position is used when the full-aperture f-number of a lens having no indicator pins ($P_1'$ through $P_4'$) is 2.8 or smaller. When the switch is turned off, decoding similar to that in the case of FIG. 9 is specified for the full-aperture f-number of each lens having indicator pins. When the switch is moved downwardly in FIG. 10, the switch is turned on. This position is used when the full-aperture f-number is 3.5 or larger. When the switch is turned on, decoding is specified separately according to full-aperture f-numbers larger by 1 Ev than those provided when the switch is turned off.

Figure 11:
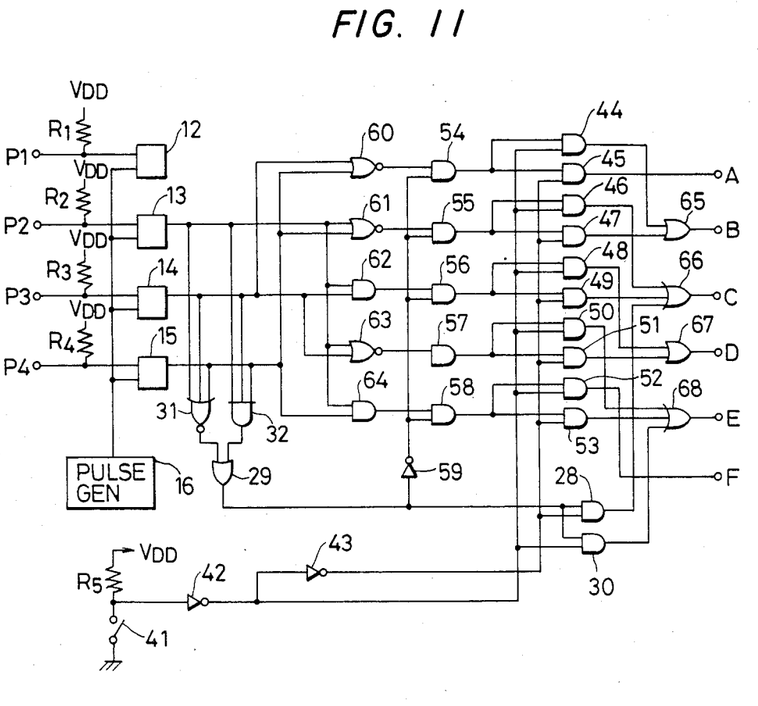

FIG. 11 shows the decoding circuit used in the third embodiment, which operates according to the truth table of Table 4. As in the case of the above-described operating switch 24, when the change-over switch 41 is turned off, the output data of AND gates 54 through 58 is passed through AND gates 45 through 53 because the output of the inverter 43 is a logic "1". In the case of the f-number being $f_0$ or $f_1$ in Table 4, the AND gates 54 through 58 pass the output data of NOR gates 60, 61 and 63 and AND gates 62 and 64 because the output of the inverter 59 is a logic "1". Therefore, for values of $P_2$, $P_3$ and $P_4$ for f-number groups other than $f_0$ and $f_1$ in Table 4, beginning with the f-number group of 1.2 and 1.4, a "1" is produced at one of the output terminals A through E in ascending order of the groups (a "1" on the terminal A for the group of 1.2 and 1.4, a "1" on the terminal B for the group of 1.7 and 2, etc.). For the full-aperture f-numbers $f_0$ and $f_1$, a "1" is produced at the terminal C by operation of the OR gate 29 and the AND gate 28. When the change-over switch 41 is turned on, the outputs of the AND gates 54 through 58 are passed through the AND gates 44 through 52. The outputs of the AND gates 44 through 52 shift the f-numbers by 1 Ev, relative to the outputs of the AND gates 45 through 53, and provide them at the output terminals B through F. The output terminal F is provided particularly for this shifting. For the full-aperture f-numbers $f_0$ and $f_1$, a "1" is provided at the terminal E by operation of an OR gate 29 and an AND gate 30. OR gates 65 through 68 selectively receive the decoding signals provided when the change-over switch 41 is turned on and off.

For instance, in a photographing operation using a microscope, a closeup ring or a rear converter, the effective f-number is liable to be larger than the actual full-aperture f-number of the lens used. However, according to the third embodiment, this difficulty can be eliminated by suitably operating the change-over switch 41. The change-over switch can, in addition, be used to set the f-number in the case where no indicator pins $P_1'$ through $P_4'$ are provided for the lens.

Preferred embodiments of the invention have been described with respect to a contrast-type focus detecting system. However, a focus detecting system based on a correlation method can be used as well.

TABLE 1

| f no. | $P_1$ | $P_2$ | $P_3$ | $P_4$ |
|---|---|---|---|---|
| $f_0$ | 0 | 0 | 0 | 0 |
| 1.2 | 0 | 1 | 0 | 0 |
| 1.4 | 1 | 1 | 0 | 0 |
| 1.7 | 0 | 0 | 1 | 1 |
| 2 | 1 | 0 | 1 | 0 |
| 2.5 | 0 | 1 | 1 | 0 |
| 2.8 | 1 | 1 | 1 | 0 |
| 3.5 | 0 | 0 | 0 | 1 |
| 4 | 1 | 0 | 0 | 1 |
| 4.5 | 0 | 1 | 0 | 1 |
| 5.6 | 1 | 1 | 0 | 1 |
| $f_1$ | 1 | 1 | 1 | 1 |

TABLE 2

| f no. | $P_2$ | $P_3$ | $P_4$ | A | B | C | D | E |
|---|---|---|---|---|---|---|---|---|
| $f_0$ | 0 | 0 | 0 | | | | | 1 |
| 1.2–1.4 | 1 | 0 | 0 | 1 | | | | |
| 1.7–2 | 0 | 1 | 0 | | 1 | | | |
| 2.5–2.8 | 1 | 1 | 0 | | | 1 | | |
| 3.5–4 | 0 | 0 | 1 | | | | 1 | |
| 4.5–5.6 | 1 | 0 | 1 | | | | | 1 |
| $f_1$ | 1 | 1 | 1 | | | | 1 | |

TABLE 3

| f no. | $P_2$ | $P_3$ | $P_4$ | SWITCH(24) OFF(~2.8) | | | | | SWITCH(24) ON(3.5~) | | | | |
|---|---|---|---|---|---|---|---|---|---|---|---|---|---|
| | | | | A | B | C | D | E | A | B | C | D | E |
| $f_0$ | 0 | 0 | 0 | | | 1 | | | | | | | 1 |
| 1.2–1.4 | 1 | 0 | 0 | 1 | | | | | | 1 | | | |
| 1.7–2 | 0 | 1 | 0 | | 1 | | | | | | 1 | | |
| 2.5–2.8 | 1 | 1 | 0 | | | 1 | | | | | | 1 | |
| 3.5–4 | 0 | 0 | 1 | | | | 1 | | | | | | 1 |
| 4.5–5.6 | 1 | 0 | 1 | | | | | 1 | | | | | 1 |
| $f_1$ | 1 | 1 | 1 | | | | 1 | | | | | | 1 |

TABLE 4

| f no. | $P_2$ | $P_3$ | $P_4$ | SWITCH(41) OFF(~2.8) | | | | | | SWITCH(41) ON(3.5~) | | | | | |
|---|---|---|---|---|---|---|---|---|---|---|---|---|---|---|---|
| | | | | A | B | C | D | E | F | A | B | C | D | E | F |
| $f_0$ | 0 | 0 | 0 | | | 1 | | | | | | | | 1 | |
| 1.2–1.4 | 1 | 0 | 0 | 1 | | | | | | | 1 | | | | |
| 1.7–2 | 0 | 1 | 0 | | 1 | | | | | | | 1 | | | |
| 2.5–2.8 | 1 | 1 | 0 | | | 1 | | | | | | | 1 | | |
| 3.5–4 | 0 | 0 | 1 | | | | 1 | | | | | | | 1 | |
| 4.5–5.6 | 1 | 0 | 1 | | | | | 1 | | | | | | | 1 |
| $f_1$ | 1 | 1 | 1 | | | | 1 | | | | | | | 1 | |

We claim:

1. In an automatic focus detecting camera having a focus detecting circuit operating in response to data specifying a full-aperture f-number of a photographing lens used with said camera, a device for supplying said data representing said full-aperture f-number comprising:

a switch for manually instructing a full-aperture f-number;

a plurality of switch contact pins provided on a surface of a lens mount of said camera, said switch pins being positioned to be operated by corresponding indicating pins on a mount of a lens attached to said lens mount of said camera, said switch pins providing a first signal state in the presence of a corresponding indiciating pin and a second state in the absence of a corresponding indicating pin, said indicating pins being provided on said lens in a pattern indicative of a full-aperture f-number of said lens; and decoding circuit means for decoding signals provided by said switch pins to produce said data representing said full-aperture f-number of said lens, said decoding circuit means comprising means for determining whether said lens has any indicating pins and means for producing as said data decoded data of said switch contact pins when said detecting means detects the presence of at least one indicating pin and data specified by said manually operated switch when said detecting means detects no indicating pin.

2. The automatic focus detecting camera of claim 1, wherein said decoding means further comprises means, operating in response to an output of said detecting means, for providing as said data a predetermined fixed value when said detecting means detects that said lens has no indicating pin.

3. The automatic focus detecting camera of claim 2, wherein said decoding means further comprises means for shifting said predetermined fixed value when said manual switch is set at a first position and producing said fixed when said manual switch is set at a second position.

* * * * *